United States Patent [19]

Hammond, Jr.

[11] 3,788,135

[45] Jan. 29, 1974

[54] PEEL ADHESION APPARATUS AND METHOD

[75] Inventor: Fred H. Hammond, Jr., Wellesley, Mass.

[73] Assignee: The Kendall Company, Walpole, Mass.

[22] Filed: June 14, 1971

[21] Appl. No.: 152,559

[52] U.S. Cl. .............................. 73/150 A, 73/15 R
[51] Int. Cl. ........................................ G01n 19/04
[58] Field of Search ........ 73/15, 15.6, 88.5, 150, 17

[56] References Cited
UNITED STATES PATENTS

| | | | |
|---|---|---|---|
| 2,588,355 | 3/1952 | Burr et al. | 73/17 |
| 3,412,606 | 11/1968 | Cooper et al. | 73/150 |
| 3,597,084 | 2/1970 | Pagano | 73/17 |
| 2,989,865 | 6/1961 | Belfour | 73/150 |
| 2,473,517 | 6/1949 | Freedman | 73/150 |

*Primary Examiner*—Herbert Goldstein
*Attorney, Agent, or Firm*—Ellen P. Trevors et al.

[57] ABSTRACT

A peel adhesion test apparatus is disclosed which comprises a time-invariant linear temperature gradient member and a thermally conductive test specimen support removably associated with said temperature gradient member in a contiguous relationship therewith. The method for determining peel adhesion over a temperature range comprises affixing a composite comprising at least one peelable layer to a thermally conductive surface, providing said conductive surface with a time-invariant linear temperature gradient, peeling said peelable layer and measuring the peel adhesion along the direction of said temperature gradient.

9 Claims, 6 Drawing Figures

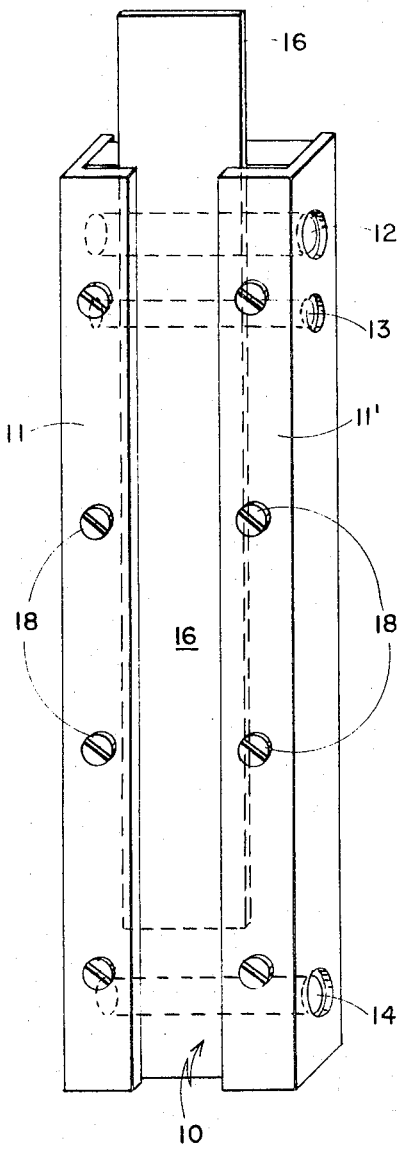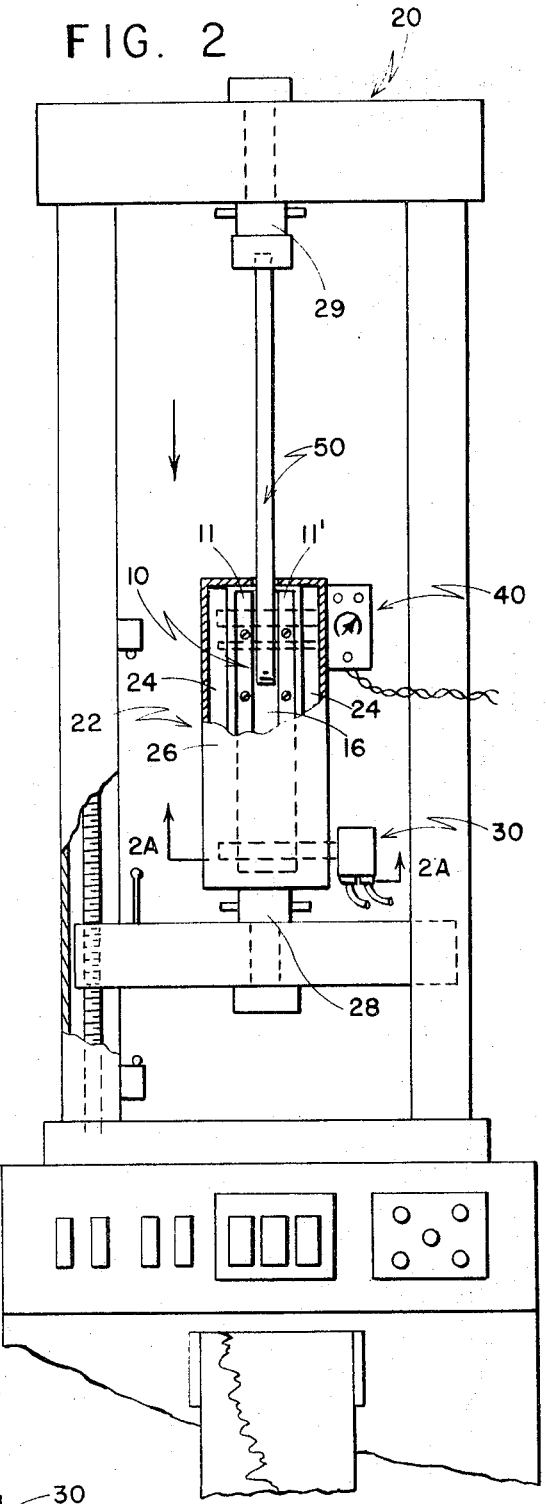

PATENTED JAN 29 1974 3,788,135

PEEL ADHESION APPARATUS AND METHOD

This invention relates to an apparatus for measuring peel adhesion as a function of temperature of a wide range of materials, and to a method therefor.

It is known to measure peel adhesion at a preselected temperature in an environmental chamber. However, where data at various temperatures is desired, it is necessary to establish each temperature separately in the chamber and take an individual reading using a fresh test sample at each temperature.

An apparatus and method for measuring the adhesion between heat sealable materials over a temperature range has been disclosed in U.S. Pat. No. 3,412,606. While functional for the intended purpose, the aforementioned apparatus and method is limited by the use of a non-linear temperature gradient which varies with time. Only one end of the apparatus is heated, the other end initially being at the temperature of the environment. However, heat is conducted along the apparatus, causing the temperature of the unheated end to vary, thus requiring simultaneous temperature measurement with each test. Since the temperature along this apparatus varies with time, it would be difficult to run a series of tests where it is desired to generate reproducible data, or data for comparison purposes. Furthermore, the method of the U.S. Pat. No. 3,412,606 employs two sheets of material having the material to be tested disposed therebetween, and requires heating to adhere the sheets together; one sheet is then peeled from the other which remains on the sample contact surface of the apparatus.

Now it has been found that the apparatus of this invention provides a highly accurate means for measuring peel adhesion of a composite containing a pre-established bond over a temperature range in one operation, using a single test sample.

More specifically, the apparatus of this invention comprises a time-invariant linear temperature gradient member and a thermally conductive test specimen support removably associated with the temperature gradient member in a contiguous relationship therewith.

For the purpose of more fully explaining further objects and features of the invention, reference is now made to the following detailed description of a preferred embodiment thereof, together with the accompanying drawings, wherein:

FIG. 1 is an isometric view of the apparatus of this invention;

FIG. 2 is a schematic front plan view of the apparatus of FIG. 1 mounted for use;

FIG. 2A is a view of the apparatus partly in cross-section taken along line 2A—2A in FIG. 2;

Figure 3:
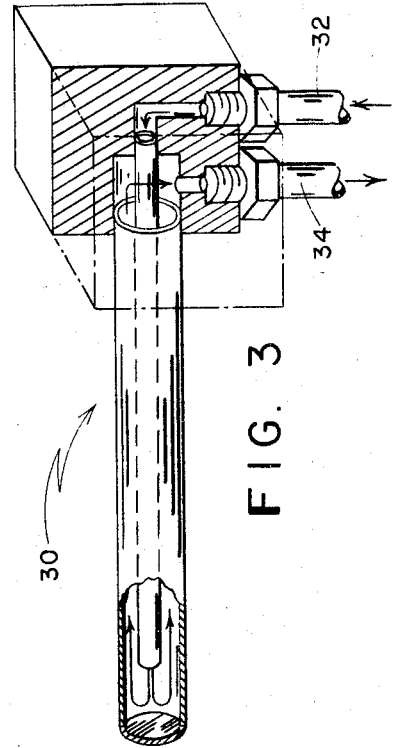
FIG. 3 is a cross-sectional view of the cold water circulating device employed in FIG. 2.

Referring to the drawings and particularly to FIG. 1, the apparatus of this invention includes a time-invariant linear temperature gradient member 10 having side pieces 11 and 11' which function as clamps for test specimen support member 16. Bores 12, 13 and 14 extend transversely through time-invariant linear temperature gradient member 10 and side pieces 11 and 11', bores 12 and 13 being located at one end and 14 at the opposite end of the apparatus. The bores are suitable for receiving temperature controlling means as described hereinafter. Test specimen support member 16 is removably associated with time-invariant linear temperature gradient member 10 and side pieces 11 and 11' by screws, four of which are designated as 18.

While the apparatus can be constructed without the side pieces, they are preferably included since they function as clamps for the test specimen support member 16. It will be apparent that the number and spacing of the screws is not critical, eight being shown for purposes of illustration.

FIG. 2 shows the apparatus of FIG. 1 mounted for use in a constant rate-of-extension tensile tester partially shown and designated as 20. The apparatus has been placed for convenience in a thermally insulated chamber 22 having a packing 24 of an insulative material such as asbestos and a protective transparent front panel 26. One end of thermally insulated chamber 22 is mounted in tensile tester 20 by crosshead coupling adapter 28. A test specimen 50 is affixed to the test specimen support; conveniently this test specimen is longer than the support and is affixed to the force measuring device of tensile tester 20 at an appropriate angle as described hereinafter by any suitable means such as a load cell coupling adapter and pin 29. Bores 12, 13 and 14 (shown in FIG. 1) are fitted respectively with an electrical heater and sensing element (shown in FIG. 4) coupled to electrical temperature control 40, and a cold water circulating device 30.

FIG. 2A shows an end view of cold water circulating device 30, 32' and 34' representing the hose barbs for connecting inlet hose 32 and outlet hose 34 (FIG. 3) to device 30; an end view of electrical temperature control 40 and a cross-sectional view of the apparatus set up for use as in FIG. 2.

FIG. 3 depicts a cross-section of the cold water circulating device 30, constructed to allow for insertion into bore 14, with inlet tube 32 and outlet tube 34 providing for circulation of water as indicated. Tubes 32 and 34 are connected to a thermostatically controlled cold water source (not shown). In lieu of such a device, mechanical refrigeration or thermoelectric cooling means can be employed.

Figure 4:
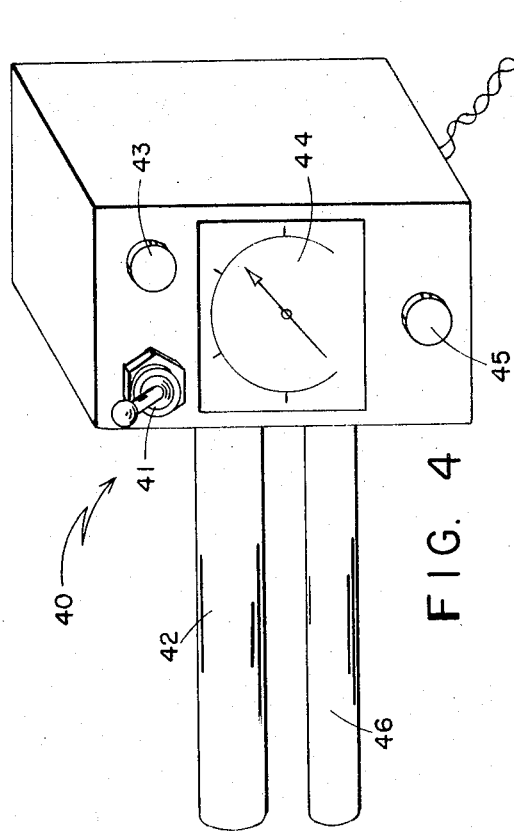
FIG. 4 is a front plan view of the electrical heater and thermostat employed in FIG. 2.

FIG. 4 shows electrical temperature control 40 coupled with electrical heater 42, the electrical heater being adapted for insertion into bore 12. The front panel of electrical temperature control 40 contains power switch 41, pilot light 43 for indicating when the power is on, temperature setting dial 44 and pilot light 45 for indicating when the desired temperature has been reached. Sensing element 46, which is a thermistor in the preferred embodiment, is provided for insertion into bore 13. However, it is also feasible to employ a thermocouple as sensing element 46, while electrical temperature control 40 can be replaced by any other means, such as a mechanical thermostat, or for less critical applications where no sensing is required, a variable transformer or proportional time control. Where a variable transformer or proportional time control is used, it will be apparent that bore 13 can be eliminated if desired.

Figure 5:
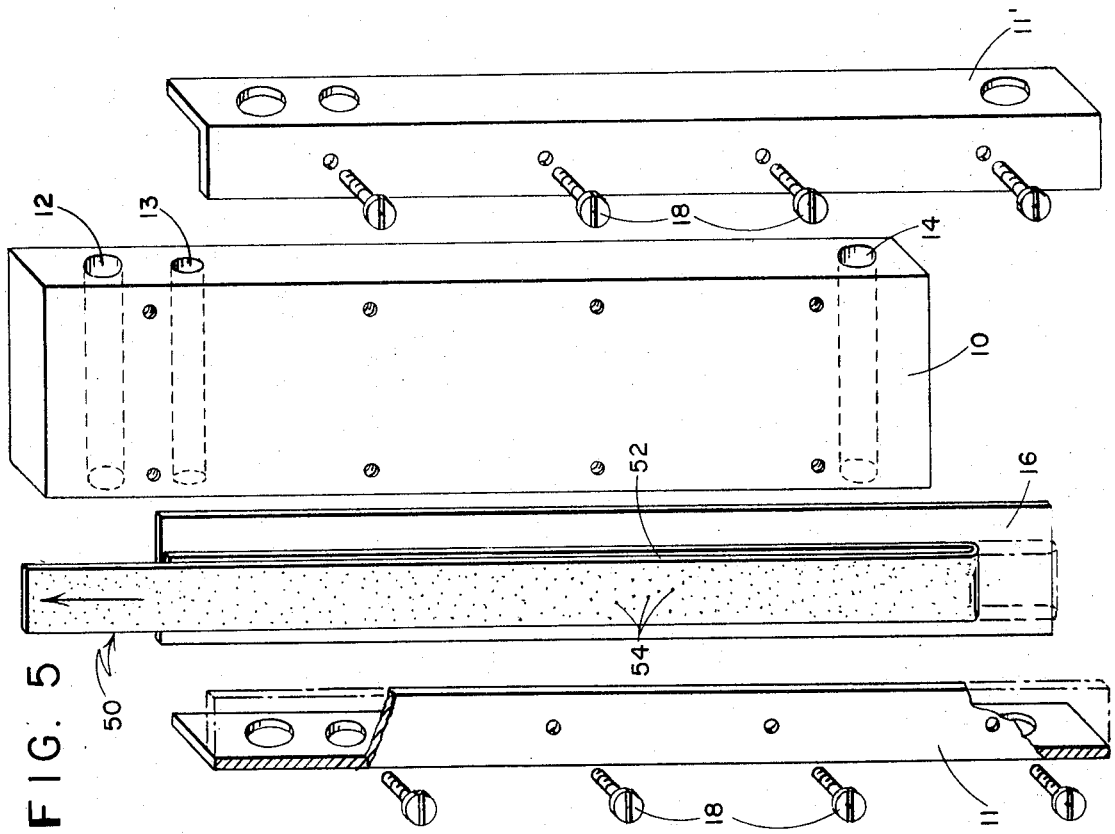
FIG. 5 is an exploded view of the apparatus of this invention in use.

In FIG. 5 the test specimen 50 comprises a tape having a flexible backing 52 and a pressure-sensitive adhesive coating 54. The tape has been affixed to the test specimen support member 16 which is bolted to the linear temperature gradient member through clamps 11 and 11'.

Thus, it will be appreciated that the provision of a member having a thermostatically controlled heat source and a thermostatically controlled heat sink allows for the establishment of a time-invariant linear temperature gradient. By time-invariant is meant that the apparatus rapidly assumes a linear temperature gradient which is steady with respect to time, thus allowing one to readily and meaningfully duplicate test results.

The apparatus of this invention can be constructed of a variety of materials. Thus the time-invariant linear temperature gradient member can be made of metals such as aluminum, copper, etc.

The only criteria for the test specimen support member is that it be of suitable thinness and thermal conductivity to assume the linear temperature gradient of member 10. Preferably, it is a thin plate of metal, electroplated metal, metal plastic laminate, plastic sheet, etc. While this test specimen support member is shown as being screwed to the time-invariant linear temperature gradient member 10, it can be affixed by other appropriate means, such as bolts, clamps, magnets, etc.

To set up the apparatus, the heating and/or cooling means are set and/or turned on to establish the desired gradient and the apparatus allowed to come to equilibrium. While any gradient can be employed, the temperature range being dependent only on the temperature controlling means, dimensions and thermal conductivity of the particular apparatus, a temperature range from about 30° to 90°C is conveniently used. Furthermore, the gradient can be preselected or measured after the temperature controlling means are turned on.

The test specimen is prepared and affixed to the support by any appropriate means, conveniently by employing the procedure described in Pressure Sensitive Tape Council Method PSTC-2, 5th Edition, Sec. 5.2 and 5.3.

Where the peel adhesion of composites such as various laminates is being determined, one can, if desired, eliminate the test specimen support member and affix the composite directly to the time-invariant linear temperature gradient member. The composite is preferably prescored along longitudinal lines to define an area excluding the means used to secure it to the time-invariant linear temperature gradient member, thereby allowing measurement of peel adhesion within the prescored area.

Then, the apparatus is mounted on any suitable constant rate-of-extension tensile tester, such as an Instron unit, and one end of the test specimen is affixed to the force measuring device of the tensile tester, either directly or through a lead, such as a metal strip, so that it will be peeled at a preselected angle. Where the measurement is made in a constant rate-of-extension tensile tester, this angle is generally 180°, and the part to be peeled is folded back upon itself and then attached to the force measuring device, as illustrated in FIG. 5.

After the test specimen has come to equilibrium, the tensile tester is then turned on and the peel adhesion measured and recorded continuously. Appropriate selection of rate of crosshead traverse of the Instron tensile tester and chart speed of the recorder associated with the tensile tester provides for a direct relationship between the time-invariant linear temperature gradient and distance along the chart, thus allowing the peel adhesion to be read at any temperature. Optionally, temperature can be read simultaneously with peel adhesion by the use of an appropriate device.

While the above operational sequence is preferred, it is not critical to the process of this invention. Thus, for example, the apparatus can be allowed to come to equilibrium while in the tensile tester, and the test specimen affixed thereto at any time prior to the peeling operation.

Although the drawings illustrate measurement of peel adhesion along the temperature gradient in the direction of increasing temperature, it will be apparent that the measurement can be taken in the direction of decreasing temperature. Where a constant rate-of-extension tensile tester is employed, this can be readily achieved by turning the assembly shown in FIG. 2 upside down and then mounting it in the tensile tester.

The apparatus has been illustrated with the heating and cooling means located proximal to opposing ends thereof. However, this positioning is done merely for convenience; it will be readily apparent that a linear temperature gradient can be established in any area of the apparatus.

The apparatus can be used independent of a constant rate-of-extension tensile tester, for example, by using any conventional force measuring device, such as spring scales, and establishing a scale for a chosen temperature gradient which can be superimposed or marked on the apparatus.

Although FIG. 5 shows the apparatus set up to measure peel adhesion at 180°, peel adhesion at angles of about 0° to 180° can be measured. Where the angle is other than 180°, accurate measurement requires movement of the apparatus toward the line of peel at the same rate as that with which the peelable layer is being removed.

While the process has been illustrated with respect to the specific embodiments illustrated herein, the essential steps thereof comprise affixing a composite comprising at least one peelable layer to a thermally conductive surface, providing said conductive surface with a time-invariant linear temperature gradient, peeling at least one peelable layer from said conductive surface or from another layer of said composite and measuring the peel adhesion along the direction of said temperature gradient. By the term "composite" in the claims and specification herein is meant any layered construction having at least two components secured together by a pre-established bond, at least one of the components being a peelable layer. By the term "pre-established bond" is meant one formed prior to affixing the composite to the apparatus. By the term "peelable layer" is meant one having sufficient flexibility to be peeled at an angle from another layer or from the conductive surface. For example, where the peel adhesion of a laminate is measured, generally one or more layers are separated from another layer of the composite, whereas a composite comprising a pressure-sensitive adhesive coating supported on a flexible backing is peeled as a unit from the conductive surface, both layers of such a composite being considered as the peelable layer.

What is claimed is:

1. In a peel adhesion test apparatus having a temperature gradient body the improvement which comprises a time-invariant linear temperature gradient member provided with a thermostatically controlled heat source and a thermostatically controlled heat sink allowing for the establishment of a time-invariant linear temperature gradient therebetween and a thermally conductive test specimen support removably associated with said temperature gradient member in a contiguous relationship therewith.

2. In combination with a constant rate-of-extension tensile tester having a force measuring device, a peel adhesion test apparatus according to claim 1, said apparatus having affixed to said thermally conductive test specimen support a composite comprising at least one peelable layer, said peelable layer being affixed at one end thereof to said force measuring device, said composite being affixed to said thermally conductive test specimen support so as to allow measurement of peel adhesion along the direction of the temperature gradient.

3. The combination according to claim 2 wherein said composite is a flexible backing having a pressure-sensitive adhesive coating supported thereon, said pressure-sensitive adhesive coating being contiguous with said thermally conductive test specimen support in the area to be peeled, and said composite being folded back upon itself and affixed at one end thereof to said force measuring device.

4. A method for determining peel adhesion over a temperature range which comprises affixing a composite comprising at least one peelable layer to a thermally conductive surface, so as to provide a bond between said peelable layer and a contiguous surface providing said conductive surface with a time-invariant linear temperature gradient, mounting said conductive surface and composite in a constant rate-of-extension tensile tester, peeling said peelable layer from said contiguous surface and measuring the peel adhesion along the direction of said temperature gradient.

5. A method for determining peel adhesion over a temperature range which comprises providing a peel adhesion test apparatus comprising a time-invariant linear temperature gradient member and a thermally conductive test specimen support removably associated with said temperature gradient member in a contiguous relationship therewith, affixing a composite comprising at least one peelable layer to said thermally conductive test specimen support so as to provide a bond between said peelable layer and said thermally conductive test specimen support, providing said thermally conductive test specimen support with a time-invariant linear temperature gradient, mounting said peel adhesion test apparatus and composite in a constant rate-of-extension tensile tester, peeling said peelable layer from said thermally conductive test specimen support and measuring the peel adhesion along the direction of said temperature gradient.

6. The method of claim 5 wherein said temperature gradient is predetermined.

7. The method of claim 5 wherein said composite comprises a flexible backing having a pressure-sensitive adhesive coating supported thereon.

8. The method of claim 7 wherein said composite is peeled from said conductive surface at an angle of about 180°.

9. A method for determining peel adhesion over a temperature range which comprises affixing a composite comprising at least one peelable layer to a thermally conductive surface so as to provide a bond between said peeable layer and a contiguous surface, providing said thermally conductive surface with a time-invariant linear temperature gradient, peeling said peelable layer from said contiguous surface and measuring the peel adhesion along the direction of said temperature gradient.

* * * * *